United States Patent [19]
Horton et al.

[11] Patent Number: 5,211,859
[45] Date of Patent: May 18, 1993

[54] LOW PH FRACTURING COMPOSITIONS

[75] Inventors: Robert L. Horton; D. V. Satyanarayana Gupta, both of The Woodlands, Tex.

[73] Assignee: The Western Company of North America, Houston, Tex.

[21] Appl. No.: 797,966

[22] Filed: Nov. 26, 1991

[51] Int. Cl.$^5$ .............................................. E21B 43/26
[52] U.S. Cl. ............................ 252/8.551; 252/315.3; 166/308
[58] Field of Search .................... 252/8.551, 315.3; 166/308

[56] References Cited

U.S. PATENT DOCUMENTS

| | | | |
|---|---|---|---|
| 3,765,918 | 10/1973 | Jordan et al. | 252/315.3 X |
| 4,110,230 | 8/1978 | Hessert et al. | 252/855 |
| 4,477,360 | 10/1984 | Almond | 252/8.55 |
| 4,488,975 | 12/1984 | Almond | 252/8.55 |
| 4,568,481 | 2/1986 | Harris, Jr. | 252/315.3 |
| 4,615,740 | 10/1986 | Pelezo et al. | 106/177 |
| 4,635,727 | 1/1987 | Anderson et al. | 166/281 |
| 4,657,081 | 4/1987 | Hodge | 166/308 |
| 4,702,848 | 10/1987 | Payne | 252/8.551 |
| 4,707,281 | 11/1987 | Miller et al. | 252/8.514 |
| 4,830,108 | 5/1989 | Hazlett et al. | 166/270 |
| 4,856,586 | 8/1989 | Phelps et al. | 166/270 |
| 4,861,500 | 8/1989 | Hodge | 252/8.551 |

Primary Examiner—Gary L. Geist
Attorney, Agent, or Firm—Peter A. Bielinski

[57] ABSTRACT

An aqueous gel comprising an aqueous fluid containing a polymeric gelling agent, a buffer, an aluminum-based crosslinking composition and a xanthan containing retardant composition. The gel is useful for fracturing and carrying propping agents within subterranean formations.

15 Claims, No Drawings

LOW PH FRACTURING COMPOSITIONS

FIELD OF THE INVENTION

This invention relates to methods and compositions for the hydraulic fracturing of subterranean formations. More particularly, it relates to hydraulic fracturing wherein a fluid having retarded crosslinking properties is injected into a formation.

BACKGROUND OF THE INVENTION

In hydraulic fracturing, a viscosified brine- or KCl-based fluid is routinely introduced at a rate and pressure sufficient to fracture the formation. At first, the fluid leaks off into the rock matrix, building up a filter cake on the rock face. The filter cake then prevents fluid injected thereafter from leaking off significantly. The full force of the applied hydraulic pressure eventually comes to bear upon the rock face, causing the rock to part at the weakest point. As the fracture grows, additional fracturing fluid containing solid proppant materials is introduced. Following this treatment, as much as possible of the introduced fluid is recovered from the formation, but the proppant remains to prevent the complete closure of the fracture. The propped fracture creates a highly conductive channel extending from the well bore into the formation, making the reservoir more productive.

The conductivity of a propped fracture is dependent on the particle size of the proppant material and the residuum of polymer and gel left behind in the fracture after cleanup. Obtaining a very high viscosity in the gel has been preferred in the past and, to a large extent, still is preferred. More viscous gels allow placement of larger particle size proppants and higher concentrations of proppants without a screenout (the proppant bridges across the mouth of the fracture prematurely, preventing the further introduction of proppant). The fracture width normally is directly proportional to the viscosity of the fracturing fluid. However, the use of high viscosity fluids to place relatively large-size proppant material in the fracture can be counter-productive whenever the high viscosity inhibits the degradation of the polymer and gel leaving the proppant pack conductivity low in spite of its large particle size. Natural products, guar gums and their derivatives, hydroxypropyl guar (HPG), and carboxymethylhydroxypropyl guar (CMHPG) have proven to have a satisfactory compromise of properties: low-cost, relatively high viscosity when suitably crosslinked, and relatively low residue left in the proppant pack.

Chemical degradation by breaking agents which are deliberately added is a necessary part of modern hydraulic fracturing technology. It is usually delayed as long as possible through the use of various strategies, including the time-release approach. Long before the deliberately-added breaker begins its work, natural mechanical, chemical, and thermal polymer degradation processes are at work, breaking down the gel.

High viscosity fracturing fluids undergo high shear stress during the introduction of such fluids into a formation. The viscosity of the fluid must be high enough to carry proppant but low enough that excessive friction losses and high well head pumping pressures are not encountered. Polymer degradation is a natural result of shear stresses imposed by pumping, the presence of abrasive materials, and high flow rates through small flow channels. This mechanical degradation accompanies thermal degradation and chemical degradation produced by acid-catalyzed hydrolysis of the acetal bonds which are the weakest links along the guar, HPG, or CMHPG polymer backbone.

Gels based on CMHPG and crosslinked at pH values in the range of 3.0 to 6.0 are preferred in the industry because such gels have a reputation for excellent proppant pack clean-up. Gels crosslinked at pH values in the range of 3.0 to 4.5 are especially preferred. Carbon dioxide, when dissolved in water or brines, tends to drive the pH into the latter pH range. Gels crosslinked at pH values in the range of 3.0 to 4.5 are yet further preferred because of their natural tendency to be compatible with $CO_2$. Such gels are useful not only in normal hydraulic fracturing but also in operations involving so-called energized fluids, foam-like or emulsion-like dispersions of high pressure $CO_2$ or $CO_2/N_2$ mixtures into a normal aqueous phase or one viscosified with polymer or crosslinked polymer.

SUMMARY OF THE INVENTION

By the present invention there are provided methods of forming and using an improved viscous treating fluid which is usable at low pH and moderate- to high-temperature, and under high shear in the presence of brine or potassium chloride (KCl). In one embodiment of the invention, a crosslinking delay mechanism is built in, so that the treating fluid has an initial viscosity such that solid proppants can be suspended therein and carried thereby without excessive settling, but the viscosity of the fluid is not so high that excessive friction losses are encountered in pumping the fluid.

DETAILED DESCRIPTION

In accordance with the present invention aqueous gels of unusual properties are provided comprising an aqueous fluid containing a polymeric gelling agent, a buffer, an aluminum-based crosslinking composition and an optional crosslinking retardant composition. The retardant is capable of effecting a delayed crosslinking of the gelling agent and improving the longevity of the gel at low pH and high temperature, and under high shear stress. The aqueous gel has a non-Newtonian viscosity in laminar flow, such as in subterranean formations, of from about 80 centipoise to in excess of 800 centipoise at a 170 $sec^{-1}$ shear rate. The aqueous gel of the present invention can carry great quantities of proppants into a formation to be fractured and can be introduced into the formation at suitably high rates with pumping equipment and tubular goods normally available at the wellhead. In one embodiment of the invention, a crosslinking retardant keeps the viscosity low during introduction of the aqueous gel into the formation through a conduit in which the fluid is in turbulent flow. The viscosity increase can be delayed until the gel is in the formation and in laminar flow.

The buffering agents can be any of a wide range of weak acids and salts of weak acids well known to those skilled in the art. The aqueous aluminum-based crosslinking composition comprises water, alcohol, aluminum carboxylates, acetic acid, and agents capable of chelating aluminum. The crosslinking retardant composition comprises a xanthan gum or a slurry of xanthan gum in water which may be added to the aqueous fluid prior or subsequent to the addition of the buffering agents and prior to the addition of the crosslinking agent.

The aqueous fluid utilized herein is defined as a water-alcohol solution having from about 0 to 80 percent and preferably from about 0 to 40 percent and more preferably from about 0 to 10 percent alcohol by volume of the solution. The preferred alcohols are alkanols having from 1 to 5 carbon atoms. Examples of alcohols believed to be useful in the aqueous fluid include methanol, ethanol, propanol, isopropanol, butanol, isobutanol, pentanol, furfuryl alcohol, ethylene glycol, and ethoxylated derivatives thereof.

The aqueous fluid is used to solvate the gelling agent. The solvated gelling agent is referred to hereinafter as a base gel. The pH of the aqueous fluid can be adjusted, if necessary, to render the fluid compatible with the crosslinking agent used to crosslink the solvated gelling agent. The pH adjusting material can be added to the aqueous fluid before, after, or during addition of the gelling agent to the aqueous fluid.

The gelling agent useful in the present invention is selected from solvatable polysaccharides having molecular weights of at least 100,000. Examples of polysaccharides useful herein include the galactomannan gums, glucomannan gums, and their derivatives. References to any polysaccharides shall include their derivatives. Solvatable galactomannan and glucomannan gums are naturally occurring. The galactomannan gums and glucomannan gums also can be reacted with hydrophilic constituents to thereby produce gelling agents useful herein.

Solvatable polysaccharides having molecular weights of greater than about 200,000 are preferred. The most preferred solvatable polysaccharides useful herein have molecular weights in the range of from about 200,000 to about 3,000,000.

Guar gum, locust bean gum, karaya gum, sodium carboxymethyl guar, hydroxyethyl guar, sodium carboxymethylhydroxyethyl guar, hydroxypropyl guar and sodium carboxymethylhydroxypropyl guar are examples of gelling agents useful herein. The preferred gelling agents are guar gum, hydroxypropyl guar and sodium carboxymethylhydroxypropyl guar. The most preferred gelling agent is sodium carboxymethylhydroxypropyl guar.

The gelling agent useful herein is present in the aqueous fluid in a concentration in the range of from about 0.2 to about 1.25 percent, preferably from about 0.2 to about 1.0 percent and most preferably from about 0.4 to about 0.7 percent by weight of the aqueous fluid.

The aluminum-based crosslinking composition of the present invention comprises water, alcohol, aluminum carboxylates, acetic acid, and agents capable of chelating aluminum. The preferred alcohols are the alkanols having from 1 to 5 carbon atoms, as stated above.

The aluminum carboxylates may be salts of the homologous series comprising formic, acetic, propionic, and butyric acids or oxalic, malonic, and succinic acids, or citric acid or glyoxylic acid or glycolic acid or o-, m-, or p-phthalic acids or glucuronic acid. Many other aluminum carboxylates useful in accordance with the present invention will be obvious to those skilled in the art.

The agents capable of chelating aluminum may include di- and polycarboxylic acids and their salts, such as tataric acid and sodium tartrate. The chelated aluminum may include such di- and polyketone-containing compounds as aluminum aceto-acetonate. The agents capable of chelating aluminum may include di- and polyketone-containing compounds, such as pentane- dione. Many other chelated aluminum compounds and agents capable of chelating aluminum, useful in accordance with the present invention will be obvious to those skilled in the art.

The amount of crosslinking compound useful to crosslink the gelling agent of this invention is that which provides an aluminum ion concentration in the range of from about 0.0005 percent to in excess of about 0.01 percent by weight of the aqueous gelled fluid. The preferred concentration is in the range of from about 0.0015 percent to about 0.01 percent by weight of the aqueous gelled fluid.

The most preferred concentration is dependent upon pH and should be determined under the conditions to be used in the field application. It has been observed that the most preferred concentration of aluminum crosslinking composition useful in accordance with this invention is greater a lower pH.

The rate of the unretarded crosslinking reaction is extremely rapid. At ambient temperature, the complexed aluminum crosslinking compositions can crosslink the polysaccharides, comprising the gelling agent in as little as 10 to 15 seconds. When the aqueous fluid of the base gel is maintained at an elevated temperature, such as when preheated solutions are employed having a temperature above 100° F., the unretarded crosslinking reaction occurs almost instantaneously upon introduction of the crosslinking compound into the base gel. Sometimes such rapid reaction rates may not permit the gelled fluid to be pumped into the subterranean formation before a significant increase in the viscosity of the fluid occurs.

In one embodiment of the invention, the introduction of a retarded crosslinking composition comprising xanthan gum or a slurry of xanthan gum in water to the base gel provides a controllable delay in the rate of the crosslinking reaction. This retarded aqueous gel readily can be introduced through a conduit into a subterranean formation sought to be fractured as a result of its relatively low initial viscosity. The significant increase in the viscosity of the gel through crosslinking as it reaches the lower portion of the conduit or upon entry into the formation facilitates the fracturing process through a reduction in the hydraulic horsepower necessary to effect the fracture.

The retarded crosslinking composition is prepared by admixing the xanthan gum and the base gel either before or after buffering to the appropriate pH; thereafter, the crosslinking compound is added. The amount of xanthan added may vary from a weight ratio of xanthan to the added amount of the crosslinking compound in the range of from about 0.00001:1 to about 10:1. Preferably, the weight ratio is in the range of from about 0.01:1 to about 4:1; and, most preferably, the weight ratio is about .1:1 to about 2:1. The constituents can be admixed in any conventional mixing apparatus, such as for example, a batch mixer. The weight ratio of xanthan to the gelling agent may vary in the range from about 0.0000001:1 to about 1:1. It has been found that a weight ratio of xanthan to the gelling agent below about 0.1:1, the high temperature rheological properties of the aqueous gels formed with the retarded crosslinking composition of the present invention are essentially equal to those of similar gels without xanthan added.

It has been found that at low pH (about 3.0), the high temperature rheological properties of the aqueous gels formed with the retarded crosslinking composition of the present invention are superior to those of similar gels without xanthan added. The pH of the gels may vary from about 2.0 to about 4.5 with a preferred range of 3.0 to 4.0.

Conventional propping agents can be employed with the fracturing fluid compositions of the present invention. Propping agents may include both natural and man-made ceramics, quartz, sand grains, tempered glass beads, rounded walnut shell fragments, aluminum pellets, sintered bauxite, nylon pellets, resin-coated sands and ceramics, and similar materials. Propping agents generally are used in concentrations in t he range of from about 1 to about 10 pounds per gallon of the aqueous fluid; however, higher or lower concentrations may be used as required. The particular size of propping agent employed is a function of the nature of the formation to be fractured, the pressure required to produce the fracture, and pumping fluid flow rates available, as well as other known factors. Particle sizes in the range of from about 200 to about 2 mesh on the U.S. Sieve Series scale can be employed in fracturing well formations with the compositions of the present invention.

The aqueous gel of the present invention can be prepared for use by mixing a predetermined quantity of the solvatable polysaccharide gelling agent with a quantity of aqueous fluid to form a solvated gel. Any conventional batch mixing apparatus can be employed for this purpose. After the gelling agent, aqueous fluid, and optionally xanthan, have been mixed for a time sufficient to dissolve the gelling agent and form the base gel, a quantity of the crosslinking composition is mixed with the gel. The mixture then is pumped into the wellbore and into the formation as the unretarded, or optionally the retarded, crosslinking reaction takes place. Proppant can be added to the base gel prior to addition of the crosslinkant composition or subsequently as the gel is introduced into the wellbore.

A preferred process for fracturing a subterranean formation penetrated by a well bore comprises injecting down the wellbore and into the formation, at a pressure sufficient to fracture the formation, a fluid comprising an aqueous gel which is prepared by adding from about 15 to about 80 pounds, preferably from about 30 to about 70 pounds, of gelling agent comprising carboxymethylhydroxypropyl guar to each 1,000 gallons of aqueous fluid containing about 0 to about 10 percent by volume methanol. The pH of the aqueous fluid can be adjusted by the addition of a sufficient quantity of an appropriate buffering agent such as sulfamic acid, fumaric acid, formic acid, acetic acid, sodium bicarbonate, or mixtures of these. To each 1,000 gallons of aqueous fluid is added 0 to about 1 gallon of a xanthan slurry containing about 26.5% active polymer. An example of such a xanthan slurry is one made available commercially by Pfizer Chemical under the name Flocon 4800C. The base gel or the mixture of base gel and xanthan is introduced into the well bore and, as it is introduced, a proppant is introduced in an amount of from about 1 pound to about 14 pounds per gallon and the crosslinking composition then is introduced. The crosslinking composition is comprised of complexed aluminum or aqueous-alcohol dilutions thereof. An example of such a crosslinking composition is one made available commercially by Zirconium Technology Corporation under the tradename RO-248.

After the aqueous gel has been pumped into the subterranean formation and a fracture has been formed, it is desirable to convert the gel into a low viscosity fluid so that it can be recovered from the formation through the well bore. This conversion often is referred to as "breaking" the gel. There are various methods available for breaking the aqueous gel of the present invention. The gels of the present invention break after the passage of time and/or prolonged exposure to high temperatures. It is desirable to be able to predict breaking time within relatively narrow limits, therefore, breakers optionally can be included in the crosslinked gel of the present invention. Mild oxidizing agents are useful as breakers when a gel is used in a relatively high temperature formation, although formation temperatures of 200° F. or greater will generally break the gel relatively quickly without the aid of an oxidizing agent. A suitable oxidizing agent is ammonium persulfate. For crosslinked gels used at temperatures below about 140° F., enzymes are generally used as breakers. Suitable enzymes include alpha and beta amylases, amyloglucosidase, oligoglucosidase, invertase, maltase, cellulase, and hemicellulase.

The following examples are provided to further illustrate the invention. The examples are not intended to limit the scope of this invention.

EXAMPLES

Table I presents some of the results of rheological tests using the invention. The tests were designed to illustrate specific examples of hydraulic fracturing fluid formulations having properties suitable to serve as examples of the use of the invention in the field practice of hydraulic fracturing. Some of the tests are controls for the purpose of comparison of the response due to the change of one or more of the parameters which govern the behavior and properties of the hydraulic fracturing fluids formulated in accordance with the present invention.

In evaluating the rheological properties of hydraulic fracturing fluids for effectiveness in creating a fracture and for carrying proppant into it, several convenient measures have been included in Table I. At various times during a rheological test, apparent viscosity is measured at shear strain rates varying from 170 to 400 $\sec^{-1}$. The fluids involved in this study are characterized as power-law fluids; therefore, a log-log plot of the shear stress versus the shear strain rate will be linear. The independent variable is shear strain rate, also called simply shear rate; and the dependent variable, shear stress. From the intercept and slope of these straight lines we obtain the flow behavior index, $n'$, and the consistency index, $K'$. Generally, plots of $n'$ versus time and plots of the log of the apparent viscosity versus time will be quite linear, as well. The slopes and intercepts of these $n'$ versus time and log of the apparent viscosity versus time plots are given in the right-most four columns of Table I.

In view of the linearity of the plots of the log of the apparent viscosity versus time, we find it convenient to extract two variables which smooth and succinctly summarize the rheology data. The slopes and intercepts of the straight lines are used to extrapolate backward to $t=0$ and forward to viscosity=80 cp. These values are the center two columns of Table I, labelled, respectively, "Calculated Apparent Viscosity at $t=0$" and "Calculated Time to Viscosity=80 cp". For the design of hydraulic fracturing work in the field, these two variables do not provide sufficient detail. But for a quick assessment of the effectiveness of hydraulic fracturing fluids for creating a fracture and carrying proppant into it, the minimum requirements are only that a fracturing fluid have a high viscosity early on during the job and stay at least above about 80 cp for as long as possible. The values in the center two columns of Table I provide this effectiveness characterization quickly and simply.

A benefit of adding xanthan not mentioned above is apparent from comparing runs 97-1 and 94-1:

Run Numbers: 97-1 94-1

TABLE I

| Run No. LN1011 | Base Fluid* | Polymer lbs/Mgal WZ499663 | Cross-linkant WZ499671 GPT | Ratio of '671 to '663 gal/lb | Temp °F. | pH | Calc'd App'nt Visc. at t = 0 cp | Cal'd Time to Visc. = 80 cp hrs | Calculated Apparent Viscosity Curve Slope × −100 | Intercept | Calculated n' Curve Slope × 1000 | Intercept |
|---|---|---|---|---|---|---|---|---|---|---|---|---|
| 36-1 | 2 | 40 | 0.7500 | 0.0188 | 180 | 4.5 | 539.8 | 7.81 | 0.171357 | 2.732205 | −0.722960 | 0.598328 |
| 39-1 | 2 | 40 | 0.7500 | 0.0188 | 180 | 4.5 | 311.8 | 5.89 | 0.159676 | 2.493862 | −0.289151 | 0.630314 |
| 42-1 | 2 | 40 | 0.7500 | 0.0188 | 180 | 4.5 | 659.6 | 8.15 | 0.181996 | 2.819282 | −0.564149 | 0.687146 |
| 43-1 | 2 | 30 | 0.5000 | 0.0167 | 200 | 5.2 | 210.5 | 1.62 | 0.404074 | 2.323267 | −0.243956 | 0.483043 |
| 46-1 | 2 | 50 | 2.0000 | 0.0400 | 180 | 3.0 | 340.6 | 1.69 | 0.596061 | 2.532243 | 0.784867 | 0.417286 |
| 49-1 | 2 | 50 | 0.7500 | 0.0150 | 180 | 3.0 | 111.4 | 0.71 | 0.277609 | 2.046949 | 1.415126 | 0.341540 |
| 52-1 | 2 | 50 | 1.5000 | 0.0300 | 180 | 3.0 | 251.7 | 2.28 | 0.344477 | 2.400889 | 1.003409 | 0.269436 |
| 55-1 | 2 | 50 | 3.0000 | 0.0600 | 180 | 3.0 | 306.6 | 4.25 | 0.218495 | 2.486524 | −0.360518 | 0.324755 |
| 58-1 | 2 | 50 | 5.0000 | 0.1000 | 180 | 3.0 | 284.9 | 7.55 | 0.116034 | 2.454727 | −0.781132 | 0.446664 |
| 61-1 | 2 | 50 | 6.0000 | 0.1200 | 180 | 3.0 | 393.2 | 4.84 | 0.229059 | 2.594563 | −0.117373 | 0.470481 |
| 64-1 | 2 | 50 | 5.0000 | 0.1000 | 200 | 3.0 | 381.4 | 1.61 | 0.673626 | 2.581406 | −2.268096 | 0.703443 |
| 67-1 | 2 | 80 | 10.0000 | 0.1250 | 218 | 3.0 | 705.1 | 1.08 | 1.413603 | 2.848228 | 3.000218 | 0.373511 |
| 67-2 | 2 | 80 | 10.0000 | 0.1250 | 210 | 3.0 | 641.4 | 1.24 | 1.179539 | 2,807136 | −4.569285 | 0.422028 |
| 70-1 | 2 | 30 | 1.2500 | 0.0417 | 180 | 4.5 | 506.5 | 4.65 | 0.277646 | 2.704554 | 0.290457 | 0.565194 |
| 73-1 | 2 | 50 | 3.0000 | 0.0600 | 180 | 3.0 | 292.4 | 2.84 | 0.314441 | 2.465943 | 0.536999 | 0.418687 |
| 76-1 | 2 | 50 | 3.0000 | 0.0600 | 180 | 3.0 | 372.6 | 3.50 | 0.305738 | 2.571246 | 0.048216 | 0.449740 |
| 79-1 | 2 | 50 | 5.0000 | 0.1000 | 180 | 3.0 | 366.8 | 4.63 | 0.228427 | 2.564442 | 0.293631 | 0.455883 |
| 82-1 | 2 | 40 | 1.0000 | 0.0250 | 180 | 4.5 | 266.4 | 4.17 | 0.198097 | 2.425521 | 0.083219 | 0.412090 |
| 85-1 | 2 | 20 | 0.3750 | 0.0188 | 180 | 4.5 | 181.3 | 2.07 | 0.265367 | 2.258386 | −0.869744 | 0.644615 |
| 88-1 | 2 | 25 | 0.4375 | 0.0175 | 180 | 4.5 | 205.1 | 1.66 | 0.384592 | 2.312038 | −1.551954 | 0.778177 |
| 91-1 | 0 | 25 | 0.4375 | 0.0175 | 180 | 4.5 | 265.5 | 4.12 | 0.199958 | 2.423988 | −0.089796 | 0.516394 |
| 94-1 | 2 | 40** | 6.0000 | 0.1500 | 180 | 3.0 | 245.1 | 3.81 | 0.201184 | 2.389396 | 0.392884 | 0.512310 |
| 97-1 | 2 | 40 | 6.0000 | 0.1500 | 180 | 3.0 | 172.6 | 2.55 | 0.201184 | 2.236974 | −1.094399 | 0.693490 |
| 100-1 | 2 | 20 | 0.3750 | 0.0188 | 180 | 4.5 | 154.0 | 2.51 | 0.171628 | 2.187456 | 0.306057 | 0.446006 |
| 103-1 | 0 | 40 | 0.7500 | 0.0188 | 180 | 4.5 | 838.9 | 14.39 | 0.115137 | 2.923736 | 0.060475 | 0.313891 |
| 106-1 | 2 | 40 | 0.7500 | 0.0188 | 180 | 4.5 | 549.9 | 6.95 | 0.194505 | 2.740297 | −0.052930 | 0.671078 |

*% KCl (Includes 10 lbs/Mgal Sodium Thiosulfate)
**Includes Xanthan

TABLE II

| Run No. LN1011 | Base Fluid* | Polymer lbs/Mgal WZ499663 | Cross-linkant WZ499671 GPT | Ratio of '671 to '663 gal/lb | Temp °F. | pH | Calc'd App'nt Visc. at t = 0 cp | Cal'd Time to Visc. = 80 cp hrs | Calculated Apparent Viscosity Curve Slope × −100 | Intercept | Calculated n' Curve Slope × 1000 | Intercept |
|---|---|---|---|---|---|---|---|---|---|---|---|---|
| 97-1 | 2 | 40 | 6.0000 | 0.1500 | 180 | 3.0 | 172.6 | 2.55 | 0.201184 | 2.236974 | −1.094399 | 0.693490 |
| 94-1 | 2 | 40** | 6.0000 | 0.1500 | 180 | 3.0 | 245.1 | 3.81 | 0.201184 | 2.389396 | 0.392884 | 0.512310 |
| 49-1 | 2 | 50 | 0.7500 | 0.0150 | 180 | 3.0 | 111.4 | 0.71 | 0.277609 | 2.046949 | 1.415126 | 0.341540 |
| 52-1 | 2 | 50 | 1.5000 | 0.0300 | 180 | 3.0 | 251.7 | 2.28 | 0.344477 | 2.400889 | 1.003409 | 0.269436 |
| 46-1 | 2 | 50 | 2.0000 | 0.0400 | 180 | 3.0 | 340.6 | 1.69 | 0.596061 | 2.532243 | 0.784867 | 0.417286 |
| 76-1 | 2 | 50 | 3.0000 | 0.0600 | 180 | 3.0 | 372.6 | 3.50 | 0.305738 | 2.571246 | 0.048216 | 0.449740 |
| 55-1 | 2 | 50 | 3.0000 | 0.0600 | 180 | 3.0 | 306.6 | 4.25 | 0.218495 | 2.486524 | −0.360518 | 0.324755 |
| 73-1 | 2 | 50 | 3.0000 | 0.0600 | 180 | 3.0 | 292.4 | 2.84 | 0.314441 | 2.465943 | 0.536999 | 0.418687 |
| 79-1 | 2 | 50 | 5.0000 | 0.1000 | 180 | 3.0 | 366.8 | 4.63 | 0.228427 | 2.564442 | 0.293631 | 0.455883 |
| 58-1 | 2 | 50 | 5.0000 | 0.1000 | 180 | 3.0 | 284.9 | 7.55 | 0.116034 | 2.454727 | −0.781132 | 0.446664 |
| 61-1 | 2 | 50 | 6.0000 | 0.1200 | 180 | 3.0 | 393.2 | 4.84 | 0.229059 | 2.594563 | −0.117373 | 0.470481 |
| 85-1 | 2 | 20 | 0.3750 | 0.0188 | 180 | 4.5 | 181.3 | 2.07 | 0.265367 | 2.258386 | −0.869744 | 0.644615 |
| 100-1 | 2 | 20 | 0.3750 | 0.0188 | 180 | 4.5 | 154.0 | 2.51 | 0.171628 | 2.187456 | 0.306057 | 0.446006 |
| 70-1 | 2 | 30 | 1.2500 | 0.0417 | 180 | 4.5 | 506.5 | 4.65 | 0.277646 | 2.704554 | 0.290457 | 0.565194 |
| 36-1 | 2 | 40 | 0.7500 | 0.0188 | 180 | 4.5 | 539.8 | 7.81 | 0.171357 | 2.732205 | −0.722960 | 0.598328 |
| 106-1 | 2 | 40 | 0.7500 | 0.0188 | 180 | 4.5 | 549.9 | 6.95 | 0.194505 | 2.740297 | −0.052930 | 0.671078 |
| 39-1 | 2 | 40 | 0.7500 | 0.0188 | 180 | 4.5 | 311.8 | 5.89 | 0.159676 | 2.493862 | −0.289151 | 0.630314 |
| 82-1 | 2 | 40 | 1.0000 | 0.0250 | 180 | 4.5 | 266.4 | 4.17 | 0.198097 | 2.425521 | 0.083219 | 0.412090 |
| 88-1 | 2 | 25 | 0.4375 | 0.0175 | 180 | 4.5 | 205.1 | 1.66 | 0.384592 | 2.312038 | −1.551954 | 0.778177 |
| 91-1 | 0 | 25 | 0.4375 | 0.0175 | 180 | 4.5 | 265.5 | 4.12 | 0.199958 | 2.423988 | −0.089796 | 0.516394 |
| 42-1 | 2 | 40 | 0.7500 | 0.0188 | 180 | 4.5 | 659.6 | 8.15 | 0.181996 | 2.819282 | −0.564149 | 0.687146 |
| 103-1 | 0 | 40 | 0.7500 | 0.0188 | 180 | 4.5 | 838.9 | 14.39 | 0.115137 | 2.923736 | 0.060475 | 0.313891 |
| 64-1 | 2 | 50 | 5.0000 | 0.1000 | 200 | 3.0 | 381.4 | 1.61 | 0.673626 | 2.581406 | −2.268096 | 0.703443 |
| 67-2 | 2 | 80 | 10.0000 | 0.1250 | 210 | 3.0 | 641.4 | 1.24 | 1.179539 | 2,807136 | −4.569285 | 0.422028 |
| 67-1 | 2 | 80 | 10.0000 | 0.1250 | 218 | 3.0 | 705.1 | 1.08 | 1.413603 | 2.848228 | 3.000218 | 0.373511 |
| 43-1 | 2 | 30 | 0.5000 | 0.0167 | 200 | 5.2 | 210.5 | 1.62 | 0.404074 | 2.323267 | −0.243956 | 0.483043 |

*% KCl (Includes 10 lbs/Mgal Sodium Thiosulfate)
**Includes Xanthan

The rows of data in Table I are organized by Run Number. The data are reorganized in Table II to facilitate making and explaining some important compari-

| | | |
|---|---|---|
| Aqueous Base Fluid (% KCl): | 2 | 2 |
| CMHPG gelling agent, WZ499663, lb/1,000 gal.: | 40 | 40 |
| Xanthan slurry, Pfizer Flocon 4800C, gal/1,000 gal.: | 0 | 1 |

-continued

| Run Numbers: | 97-1 | 94-1 |
|---|---|---|
| Crosslinking composition WZ499671, gal/1,000 gal.: | 6 | 6 |
| Temperature (°F.): | 180 | 180 |
| pH: | 3.0 | 3.0 |
| Calc. apparent visc. at t = 0 (cp): | 172.6 | 245.1 |
| Calc. time to visc. = 80 cp (hr): | 2.55 | 3.81 |

Xanthan slurry, Flocon 4800C is available from Pfizer Chemical Division, Pfizer Inc., New York, New York.

WZ499663 carboxymethylhydroxypropyl guar gelling agent is available from Aqualon Co., Houston, Texas.

WZ499671 aluminum chelate of glucuronic acid is available commercial Zirconium Technology Corporation, Midland, Texas, under the tradename RO-248.

Adding xanthan not only delays the crosslink, but the data shows that under these conditions, adding xanthan also both improves the initial viscosity of the fracturing fluid and allows it to remain viscous longer. A limited number of systems of this type involving added xanthan have been formulated but the rheology was not tested because the cross-linking delay was too long and an adequate gel was not formed. Generally, these inadequate gels were observed at the same conditions as for 94-1, but with crosslinking composition loading below 5 GPT gallons per thousand gallons. Run 94-1 involved theological study of a gel with xanthan added.

Instead of adding xanthan, extra CMHPG can be added into the formulation. No crosslink delay will be seen, but the initial viscosity and endurance benefits of increased CMHPG loading is apparent from comparing runs 97-1 and 6-1:

| Run Numbers: | 97-1 | 61-1 |
|---|---|---|
| Aqueous Base Fluid (% KCl): | 2 | 2 |
| CMHPG (WZ499663) (Lbs./1,000 gal.): | 40 | 50 |
| Crosslinking composition (WZ499671) (GPT): | 6 | 6 |
| Temperature (°F.): | 180 | 180 |
| pH: | 3 | 3 |
| Calc. apparent visc. at t = 0 (cp): | 172.6 | 393.2 |
| Calc. time to visc. = 80 cp (hr): | 2.55 | 4.84 |

Comparing runs 49-1, 52-1, 46-1, 76-1, 55-1, 73-1, 79-1, 58-1, and 61-1, shows that in 50 lb gels at pH 3 the reduction in crosslinking composition loading from 6 down to about 3 GPT has relatively little effect on the viscosity or endurance of the formulation. Further reduction begins to reduce the performance of the gels; and reduction as far as 0.75 GPT shows a marked reduction in the viscosity and endurance of the formulation:

| Run Numbers: | 49-1 | 76-1 |
|---|---|---|
| Aqueous Base Fluid (% KCl): | 2 | 2 |
| CMHPG (WZ499663) (Lbs./1,000 gal.): | 50 | 50 |
| Crosslinking composition (WZ499671) (GPT): | 0.75 | 3 |
| Temperature (°F.): | 180 | 180 |
| pH: | 3 | 3 |
| Calc. apparent visc. at t = 0 (cp): | 111.4 | 372.6 |
| Calc. time to visc. = 80 cp (hr): | 0.71 | 3.50 |

Comparing runs 49-1, 106-1, 39-1, and 42-1, is primarily an evaluation of the effect of changing pH from 3.0 to 4.5. There is also a reduction in CMHPG loading which, alone, would make 49-1 superior in viscosity and endurance to 106-1, 39-1, and 42-1. The fact that 49-1 is greatly inferior in viscosity and endurance to 106-1, 39-1, and 42-1 shows the predominant influence of pH:

| Run Numbers: | 49-1 | 106-1 | 39-1 | 42-1 |
|---|---|---|---|---|
| Aqueous Base Fluid (% KCl): | 2 | 2 | 2 | 2 |
| CMHPG (WZ499663) (Lbs./1,000 gal.): | 50 | 40 | 40 | 40 |
| Crosslinking composition (WZ499671) (GPT): | 0.75 | 0.75 | 0.75 | 0.75 |
| Temperature (°F.): | 180 | 180 | 180 | 180 |
| pH: | 3.0 | 4.5 | 4.5 | 4.5 |
| Calc. apparent viscosity at t = 0 (cp): | 111.4 | 549.9 | 311.8 | 659.6 |
| Calc. time to viscosity = 80 cp (hr): | 0.71 | 6.95 | 5.89 | 8.15 |

Comparing runs 106-1, 39-1, 42-1, and 82-1 suggests that at pH 4.5, the optimum crosslinkant loading is 0.75 GPT or lower:

| Run Numbers: | 106-1 | 39-1 | 42-1 | 82-1 |
|---|---|---|---|---|
| Aqueous Base Fluid (% KCl): | 2 | 2 | 2 | 2 |
| CMHPG (WZ499663) (Lbs./1,000 gal.): | 40 | 40 | 40 | 40 |
| Crosslinking composition (WZ499671) (GPT): | 0.75 | 0.75 | 0.75 | 1.00 |
| Temperature (°F.): | 180 | 180 | 180 | 180 |
| pH: | 4.5 | 4.5 | 4.5 | 4.5 |
| Calc. apparent viscosity at t = 0 (cp): | 549.9 | 311.8 | 659.6 | 266.4 |
| Calc. time to viscosity = 80 cp (hr): | 6.95 | 5.89 | 8.15 | 4.17 |

As seen above, the optimum crosslinking composition loading at pH 4.5 is clearly much lower than the optimum crosslinking composition loading at pH 3.0.

At pH 4.5, the reduction in CMHPG loading from 40 lbs./1000 gal. to 20, while maintaining a constant (0.0188 gal/lb) ratio of crosslinking composition GMHPG, is clearly detrimental, although it must be admitted that considering the harsh environment of temperature and pH, the performance of the 20 lbs./1000 gal. systems is admirable:

| Run Numbers: | 39-1 | 85-1 | 100-1 |
|---|---|---|---|
| Aqueous Base Fluid (% KCl): | 2 | 2 | 2 |
| CMHPG (WZ499663) (Lbs./1,000 gal.): | 40 | 20 | 20 |
| Crosslinking composition (WZ499671) (GPT): | 0.75 | .375 | .375 |
| Temperature (°F.): | 180 | 180 | 180 |
| pH: | 4.5 | 4.5 | 4.5 |
| Calc. apparent viscosity at t = 0 (cp): | 311.8 | 181.3 | 154.0 |
| Calc. time to viscosity = 80 cp (hr): | 5.89 | 2.07 | 2.51 |

At pH 4.5, the reduction in CMHPG loading from 40 lbs./1000, gal. to 30, while increasing the ratio of crosslinking composition 0.0188 to 0.0417 gal/lb, is much less detrimental to the endurance and is not detrimental to the initial viscosity:

| Run Numbers: | 39-1 | 70-1 |
|---|---|---|
| Aqueous Base Fluid (% KCl): | 2 | 2 |
| CMHPG (WZ499663) (Lbs./1,000 gal.): | 40 | 30 |
| Crosslinking composition (WZ499671) (GPT): | 0.75 | 1.25 |
| Temperature (°F.): | 180 | 180 |
| pH: | 4.5 | 4.5 |
| Calc. apparent viscosity at t = 0 (cp): | 311.8 | 506.5 |
| Calc. time to viscosity = 80 cp (hr): | 5.89 | 4.65 |

As mentioned earlier, except for the hydraulic fracturing fluid system in accordance with the present invention, all systems examined at 180° F. either failed to gel initially or broke down to a viscosity under 80 cp in less than 30 minutes with KCl present and under normal conditions, including shear stress. Nevertheless, this system's KCl-intolerance is evident from the comparisons below. Basing the fluid on 2% KCl instead of de-ionized water results in inferior fluid performance, both in initial viscosity and endurance:

| Run Numbers: | 88-1 | 91-1 | 42-1 | 103-1 |
|---|---|---|---|---|
| Aqueous Base Fluid (% KCl): | 2 | 0 | 2 | 0 |
| CMHPG (WZ499663) (Lbs./1,000 gal.): | 26 | 25 | 40 | 40 |
| Crosslinking composition (WZ499671) (GPT): | .4375 | .4375 | 0.75 | 0.75 |
| Temperature (°F.): | 180 | 180 | 180 | 180 |
| pH: | 4.5 | 4.5 | 4.5 | 4.5 |
| Calc. apparent viscosity at t = 0 (cp): | 205.1 | 265.5 | 659.6 | 838.9 |
| Calc. time to viscosity = 80 cp (hr): | 1.66 | 4.12 | 8.15 | 14.39 |

The last four rows in Table II show that at temperatures as high as about 218° F. and at both low (3.0) and moderately low pH (5.2), a fracturing fluid endurance as long as 1 to 1.5 hours can be obtained:

| Run Numbers: | 64-1 | 67-2 | 67-1 | 43-1 |
|---|---|---|---|---|
| Aqueous Base Fluid (% KCl): | 2 | 2 | 2 | 2 |
| CMHPG (WZ499663) (Lbs./1,000 gal.): | 50 | 80 | 80 | 80 |
| Crosslinking composition (WZ499671) (GPT): | 5.0 | 10.0 | 10.0 | 0.5 |
| Temperature (°F.): | 200 | 210 | 218 | 200 |
| pH: | 3.0 | 3.0 | 3.0 | 5.2 |
| Calc. apparent viscosity at t = 0 (cp): | 381.4 | 641.4 | 705.1 | 210.5 |
| Calc. time to viscosity = 80 cp (hr): | 1.61 | 1.24 | 1.08 | 1.62 |

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention.

What is claimed is:

1. An aqueous gel comprising:
   an aqueous fluid comprising water and up to about 80 percent alcohol by volume of the aqueous fluid;
   a gelling agent comprising a solvatable polysaccharide having a molecular weight in excess of about 100,000 selected from the group consisting of glucomannans, galactomannans, said gelling agent being present in an amount of from about 0.2 to about 1.25 percent by weight of said aqueous fluid;
   a buffer which can maintain the pH of the gel in the range of about 2.0 to about 4.5;
   an aluminum-based crosslinking composition comprising water, aluminum carboxylates, acetic acid and an agent capable of chelating aluminum, wherein said aluminum carboxylates are selected from the group consisting of salts of the homologous series comprising formic, acetic, propionic, and butyric acids, oxalic, malonic, and succinic acids, citric acid, glyoxylic acid, glycolic acid, o-, m-, or p-phthalic acids and glucoronic acid; and
   a crosslinking retardant composition selected from the group consisting of xanthan gum and a slurry of xanthan gum in water.

2. The aqueous gel of claim 1 wherein said gelling agent comprises solvatable polysaccharides selected from the group consisting of guar gum, locust bean gum, karaya gum, sodium carboxymethylguar, hydroxyethylguar, sodium carboxymethylhydroxyethylguar, hydroxypropylguar, and sodium carboxymethylhydroxypropylguar.

3. The aqueous gel of claim 1 wherein said alcohol is selected from alkanols having from 1 to 6 carbon atoms.

4. The aqueous gel of claim 1 wherein said agent capable of chelating aluminum is selected from the group consisting of di- and polycarboxylic acids and their salts and di- and polyketone-containing compounds.

5. The aqueous gel of claim 1 wherein said agent capable of chelating aluminum are selected from the group consisting of tartaric acid, sodium tartrate and pentane-dione.

6. The gel of claim 1 wherein the crosslinking composition provides an aluminum ion concentration in the range of from about 0.0005 percent to about 0.01 percent by weight of the aqueous gelled fluid.

7. The gel of claim 1 wherein the retardant composition to crosslinking composition ratio is in the range of from about 0.00001:1 to about 10:1.

8. A process for fracturing a subterranean formation which comprises:
   introducing into said formation an aqueous gel at a flow rate and pressure sufficient to produce a fracture in said formation, said aqueous gel comprising:
   an aqueous fluid comprising water and up to about 80 percent alcohol by volume of the aqueous fluid;
   a gelling agent comprising a solvatable polysaccharide having a molecular weight in excess of about 100,000 selected from the group consisting of glucomannans, galactomannans, said gelling agent being present in an amount of from about 0.2 to about 1.25 percent by weight of said aqueous fluid;
   a buffer which can maintain the pH of the gel in the range of about 2.0 to about 4.5;
   an aluminum-based crosslinking composition comprising water, aluminum carboxylates, acetic acid and an agent capable of chelating aluminum, wherein said aluminum carboxylates are selected from the group consisting of salts of the homologous series comprising formic, acetic, propionic, and butyric acids, oxalic, malonic, and succinic acids, citric acid, glyoxylic acid, glycolic acid, o-, m- or p-phthalic acids and glucuronic acid; and
   a crosslinking retardant composition selected from the group consisting of xanthan gum and a slurry of xanthan gum in water.

9. The process of claim 8 wherein said gelling agent comprises solvatable polysaccharides selected from the group consisting of guar gum, locust bean gum, karaya gum, sodium carboxymethylguar, hydroxyethylguar, sodium carboxymethylhydroxyethylguar, hydroxypropylguar, and sodium carboxymethylhydroxypropylguar.

10. The process of claim 8 wherein said alcohol is selected from alkanols having from 1 to 6 carbon atoms.

11. The process of claim 8 wherein said agent capable of chelating aluminum is selected from the group consisting of di- and polycarboxylic acids and their salts and di- and polyketone-containing compounds.

12. The process of claim 8 wherein the agents are capable of chelating aluminum are selected from the group consisting of tartaric acid, sodium tartrate and pentane-dione.

13. The process of claim 8 wherein the crosslinking composition provides an aluminum ion concentration in the range of from about 0.0005 percent to about 0.01 percent by weight of the aqueous gel.

14. The process of claim 8 wherein the retardant composition to crosslinking composition ratio is in the range of from about 0.00001:1 to about 10:1.

15. A process for treating a subterranean formation penetrated by a well bore which comprises:

preparing a base gel by mixing an aqueous fluid with a gelling agent selected from solvatable polysaccharides having molecular weight of at least about 100,000, said gelling agent being present in an amount of from about 0.2 to about 1.25 percent by weight of said aqueous fluid;

admixing a buffer which can maintain the pH of the base gel and the range of about 2.0 to about 4.5;

admixing xanthan gum wherein the ratio of xanthan gum to crosslinking composition is between about 0.00001:1 to about 10:1;

admixing an aluminum-based crosslinking composition comprising water, alcohol, aluminum carboxylates, acetic acid and an agent capable of chelating aluminum;

introducing said base gel containing said buffer, said crosslinking composition and said xanthan gum into said well bore;

permitting said base gel and said crosslinking composition to react to form a crosslinked aqueous gel, wherein the crosslinking reaction time is increased by the presence of said xanthan gum; and introducing said crosslinked aqueous gel into said formation from said well bore at a flow rate and pressure sufficient to fracture said formation.

* * * * *